Dec. 28, 1965 W. B. GOGARTY ETAL 3,225,787
BATCHING PIG AND SEPARATION OF INTERFACES IN PIPE LINE FLOW
Filed March 15, 1962

INVENTORS
WILLIAM B. GOGARTY
GARY I. NIELSON
BY
ATTORNEYS

United States Patent Office

3,225,787
Patented Dec. 28, 1965

3,225,787
BATCHING PIG AND SEPARATION OF
INTERFACES IN PIPE LINE FLOW
William B. Gogarty and Gary I. Nielson, Littleton, Colo.,
assignors to Marathon Oil Company, a corporation of
Ohio
Filed Mar. 15, 1962, Ser. No. 179,879
7 Claims. (Cl. 137—561)

This invention relates to separation of interfaces between different materials in a pipeline flow and to inflatable pigs for maintaining a physical separation of fluids in such a flow.

One of the most important problems in the pipeline operations of the oil industry involves the separation of interfaces between two different batches of materials. As an example, a given line may be engaged in transport of a flow of gasoline followed by a product flow such as fuel oil. Various pigging methods have been devised for separation of the interface in such a line and in general the arrangements of the prior art are satisfactory so long as the flow is conducted through a line of uniform diameter.

However, many lines utilize sections of different diameter between an input point and a final discharge point. In most instances, the direction of flow will be from a smaller diameter line into a larger diameter line and pigs which provide a barrier zone between one liquid and another in a line of smaller diameter are ineffective in maintaining such separation when they pass into a section of larger diameter. The problem becomes even more aggravated when the flow in the line involves transfer from a larger diameter section to a smaller diameter section. Pigs, of the aforementioned type, if effective in the larger diameter section, are too much oversize to enter the smaller diameter section and such arrangements can only be used when a receiving station is provided at each transfer point with pigs of one diameter removed and pigs of another diameter substituted. Unless this can be accomplished under rather precise timing control, intermixing of the fluids will occur before the substituted pigs are introduced into the succeeding section for separation of the flow.

The present invention provides a departure from prior practice in maintaining physical separation of different fluids flowing through a line having sections of different diameter, in that the pigs providing the separation will automatically change diameter when moving from one diameter section into another to maintain an effective seal throughout a continuous flow through a succession of such sections. This is accomplished by a novel type of pig of an inflatable type shaped as an elongated hollow body, and preferably of uniform diameter except at its ends, which are generally rounded or hemispherical in shape to provide a complete enclosure of the hollow portion. In a preferred arrangement, an inlet valve is provided at one end and usually a discharge valve is located at the opposite end. At least one valve is provided so that the hollow portion may be filled with a suitable fluid, preferably a gel or viscous liquid, which flows to only a slight degree under extrusion effects and is essentially in a non-flowing condition during normal movements of the pig in the line. The second valve permits bleeding of air when the pig is being filled, or when it is only partially filled in the first instance, contained air must be exhausted.

Preferably the walls of the pig of the present invention are of uniform thickness except at the ends; the latter being reinforced to withstand extreme stresses occasioned by the distortion or extrusion effect resulting from transfer to a line of smaller diameter. The external diameter of the filled pig in its normal position in the line is approximately equivalent to the internal diameter of the line of greatest diameter through which it is caused to pass; and such a pig may be moved in reverse directions in the same line or move oppositely in separate lines. If introduced into the larger diameter section at the beginning of its course of travel, it tends to distort to a slight degree when first subjected to the line pressure and this will result in limited bulging at some point throughout its length which effectively seals the passage against fluid flow and initiates movement of the pig with the line flow.

The sealing effect is maintained throughout the course of travel through such a section of the line and when the pig reaches the transfer point for entrance into a smaller line, the forward end of the pig is compressed and extended forwardly to conform to the reduced inside diameter of the line and by the time such transfer is completed, the pig is substantially elongated from its normal length. Thus, it is possible for the pig to maintain an effective physical separation between the different fluids from its introduction at the input end of the line until its discharge or removal at the discharge end of the line.

When a reverse direction of flow is utilized, as in a looped circuit, the pig selected for separation of the fluids will again have an external diameter of essentially the same size as the largest diameter section through which it will pass. This requires that it be inserted into the line of smaller diameter in only a partially filled condition for easier entrance, after which the remaining portion of the desired charge is introduced into the hollow interior under whatever pressure is required and forces the external surfaces of the pig into sealing engagement with the line. Following this, the pig will be subjected to the line flow and it moves readily under the impelling influence of such flow. When it reaches a transfer point into a line section of larger diameter, its elastic properties and the enlarged space permit it to resume its normal diameter and the pressure of the following fluid will provide the necessary distortion to attain the sealing effect as soon as it is moved completely into the larger section of the line. This feature of being able to transfer effectively in either direction is one of the innovations of the present invention.

Accordingly, it is an object of our invention to provide a simple, durable and efficient batching pig which will transfer from a line section of smaller diameter into a line section of larger diameter, or from a section of larger diameter into a section of smaller diameter without impairing its separation efficiency.

Another object of our invention is to provide a simple, economical and efficient method of maintaining separation of interfaces between two different batches of materials flowing through a pipe line having sections of different diameter between the input end and the discharge end.

Other objects reside in novel details of construction and novel combinations and arrangements of parts, all of which will be described hereinafter.

The practice of the invention will be explained with reference to the accompanying drawings illustrating typical arrangements and embodiments of our invention. In the drawings, in the several views of which like parts bear similar reference numerals:

Figure 1:
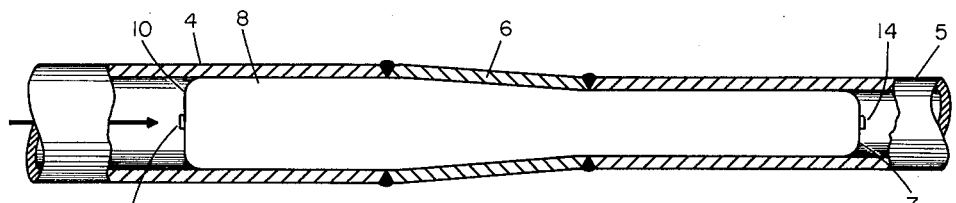
FIG. 1 is a vertical central section through a transfer stage in a pipe line having sections of different diameter illustrating the shaping conformation of the pig to internal surfaces of said section at the transfer point.
Figure 3:
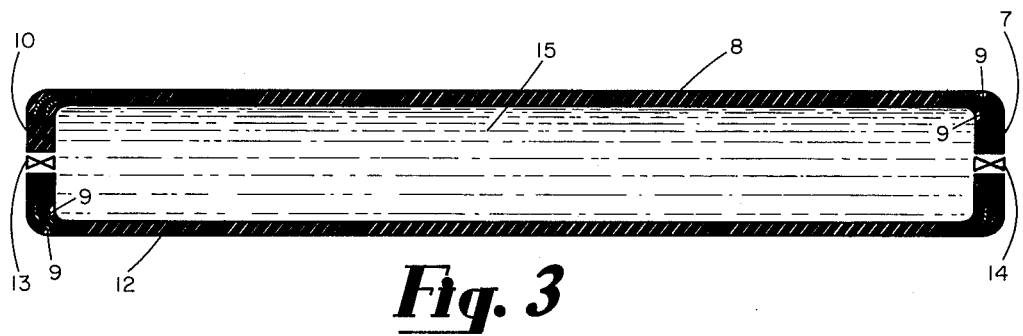
FIG. 3 is a vertical central section drawn to an enlarged scale, of a batching pig of the type illustrated in FIGS. 1 and 2.

As shown in FIG. 1, a batching pig of the type shown in FIG. 3 is shown in transfer position in passing from a line section 4 of larger diameter into another line section 5 of smaller diameter suitably joined by a coupling member 6, here shown in welded connection with said sections. As the rounded forward end of the pig 7 begins to penetrate the smaller section 5 under the impelling force of the upstream flow in the line, it is squeezed and extended or extruded along the bore conforming thereto in liquid sealing relation and continues its movement with said flow essentially without interruption. Unlike low viscosity liquids which, if similarly contained, would move at sufficient velocity to burst the elastic container, the viscous filler materials used in the practice of our invention flow sufficiently to provide the desired conforming to the dimension of the passage without producing an impact effect of a magnitude to burst the elastic cover or enclosure.

Preferably, the cover or container 8 as shown in FIG. 3 is formed of a suitable oil-resistant rubber compound with reenforcing 9 provided as required to withstand the distortion and pressures to which it is subjected. The ends 7 and 10 are substantially thicker than the intermediate portion 12, which is of uniform thickness and uniform diameter. In a preferred form, the ends are essentially hemispherical, but obviously other shapes such as conical, frustro-conical, or pyramidal may be substituted. A suitable filler material 15 fills the container 8.

Also, in a preferred arrangement, an input valve 13 is located in the rear end portion 10 so as to be readily accessible for completion of filling after the pig 8 is in place in the line. A discharge valve 14 is provided at the opposite or forward end 7 when it is desirable to have the contents removed for reuse in a similar container. The normal external diameter of the pig 8 when completely filled under pressure is substantially the same as the internal diameter of the line section of greatest diameter through which it is to pass. Consequently, when such pig is moved into the larger bore 4' from a smaller bore 5' as shown in FIG. 2, the release from confinement in a reduced space, coupled with the line pressure directed against the upstream end of the pig, causes the elastic material to assume its normal diameter accompanied by contraction from its ends.

If the external surface of the pig does not conform to the surface of the bore throughout its length, liquid under line pressure may tend to leak along the pig and disrupt the interface separation. However, with materials of the type described, the line pressure directed against the upstream end of the pig causes a bulging of the intermediate portion through restricted displacement of filler 15, which effectively seals against leakage and maintains separation of the interfaces. Such sealing also provides the requisite propulsion condition by which the pig 8 is impelled by the following flow of liquid in the line.

Figure 2:
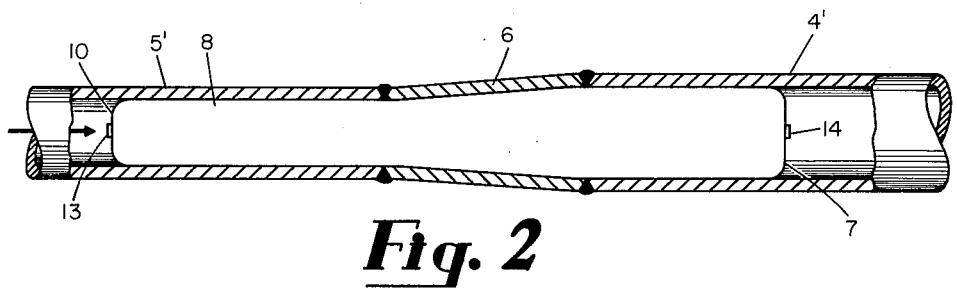
FIG. 2 is another vertical section through a transfer stage in a pipe line having sections of different diameter showing the transfer action in a reverse direction of flow to that shown in FIG. 1.

Next referring to FIG. 2, the pig 8 is shown in another line, in which it is passing from the line section 5' of smaller diameter into an adjoining line section 4' of larger diameter. Again in this arrangement, sections 4' and 5' are held in joined arrangement by a coupling section 6 as previously described. As the pig 8 passes from the smaller diameter bore into the larger diameter bore, the increased space and pressure reduction at the forward end 7 permit the pig to contact and change diameter until it is again pressed into conforming contact with the surface of the bore. This transfer is accomplished without significant change in rate of movement of the pig in the line and separation of the interfaces is effectively maintained throughout the entire flow.

In many installations, it will be preferable to provide a pig trap at the upstream end of a section of smaller diameter when the pig is to be entered into such a section at the start of a run. Such a trap comprises a short length of larger diameter pipe into which a filled pig is introduced between successive flows fed thereto. The force of the flow directed against its upstream end moves the pig into the smaller diameter section in the manner previously described and its continued movement maintains separation of the interfaces. As the pig of our invention is able to adjust easily to larger or smaller enclosures, it will function effectively in lines where flow is reversed at some intermediate point.

Various gels may be used as the filler 15 so long as they possess the flow properties previously described. We have found a gel made of 10% P–26 acrylamide copolymer and 1% aluminum sulfate in water well suited for the purposes of this invention. Aluminum octoate gels of hydrocarbon fluids may be used since the elastic material is oil resistant. Changes and modifications may be availed of within the spirit and scope of the invention as defined in the hereunto appended claims.

We claim:

1. The combination with a pipe line for transport of successive flows of liquids of different composition having at least two sections of different diameter and an interconnecting coupling section having an internal bore merging with the bores of the abutting ends of said sections, of a batching pig disposed in said line in separating relation to successive flows and comprising an elastic hollow body of substantially greater length than diameter, the normal diameter of said body when filled being substantially the same as the bore of the section of greater diameter, and a slowly-flowing viscous fluid sealed within and filling the hollow portion of said body and slowly movable within the enclosure under line pressure directed against the upstream end of said body without rupture of its enclosing surface to extend or contract said body so as to conform to the diameter of the bore through which said pig is being impelled in linear movement by said line pressure.

2. The combination with a pipe line for transport of successive flows of liquids of different composition having at least two sections of different diameter and an interconnecting coupling section having an internal bore merging with the bores of the abutting ends of said sections, of a batching pig disposed in said line in separating relation to successive flows and comprising an elastic hollow body of substantially greater length than diameter, the normal diameter of said body when filled being substantially the same as the bore of the section of greater diameter, a slowly-flowing viscous fluid sealed within and filling the hollow portion of said body and slowly movable within the enclosure under line pressure directed against the upstream end of said body to extend or contract said body without rupture of its enclosing surface so as to conform to the diameter of the bore through which said pig is being impelled in linear movement by said line pressure, and valve means at the upstream end of said pig for introduction of the filler fluid when the pig is in the bore of a line section.

3. A batching pig, for passage through connected pipeline sections of different diameter for separation of interfaces in pipe line flows producing a line pressure at the upstream end of the pig, comprising an elongated hollow body of elastic material closed at its ends to seal a contained charge of slowly-flowing viscous fluid in its interior, said body beign of substantially the same external diameter as the internal diameter of the largest line section through which it is caused to travel, and being sufficiently deformable by the line pressure of the flow directed against its upstream end to bulge and maintain sealing contact with the line section through which it is driven in a linear movement by said flow.

4. A batching pig for passage through connected pipeline sections of different diameters for separation of interfaces in pipe line flows producing a line pressure at the upstream end of the pig, comprising an elongated hollow body of elastic material closed at its ends to seal a contained charge of viscous fluid comprising an aluminum octoate gel of a hydrocarbon fluid in its interior, said body being of substantially the same external diameter as the internal diameter of the largest line section through which it is caused to travel, and being sufficiently deformable by the line pressure of the flow directed against its upstream end to bulge and maintain sealing contact with the line section through which it is moved by said flow.

5. A batching pig for passage through connected pipeline sections of different diameters for separation of interfaces in pipe line flows producing a line pressure at the upstream end of the pig, comprising an elongated hollow body of elastic material closed at its ends to seal a contained charge of viscous fluid comprising an acrylamide copolymer and aluminum sulfate in its interior, said body being of substantially the same external diameter as the internal diameter of the largest line section through which it is caused to travel, and being sufficiently deformable by the line pressure of the flow directed against its upstream end to bulge and maintain sealing contact with the line section through which it is moved by said flow.

6. A batching pig for passage through connected pipeline sections of different diameters for separation of interfaces in pipe line flows producing a line pressure at the upstream end of the pig, comprising an elongated hollow body of elastic material closed at its ends to seal a contained charge of slowly-flowing viscous fluid in its interior, said body being of substantially the same external diameter as the internal diameter of the largest line section through which it is caused to travel, said elastic material being of substantially uniform thickness except at its ends which are reinforced rounded on the exterior surface, and of greater thickness than the intermediate portions, and said body being sufficiently deformable along its lengthwise axis by the line pressure of the flow directed against its upstream end to slowly changed length and diameter so as to bulge and maintain sealing contact with the line section through which it is driven in a linear movement by said flow.

7. A batching pig for passage through connected pipeline sections of different diameters for separation of interfaces in pipe line flows producing a line pressure at the upstream end of the pig, comprising an elongated hollow body of elastic material closed at its ends to seal a contained charge of slowly-flowing viscous fluid in its interior, said body being of substantially the same external diameter as the internal diameter of the largest line section through which it is caused to travel, and being sufficiently deformable by the line pressure of the flow directed against its upstream end to bulge and maintain sealing contact with the line section through which it is driven in linear movement by said flow, and valve means extending through a wall of said body for introduction and withdrawal of said viscous fluid.

References Cited by the Examiner
UNITED STATES PATENTS

| | | | |
|---|---|---|---|
| 2,796,878 | 6/1957 | Atkinson | 137—1 |
| 2,906,650 | 9/1959 | Wheaton | 15—104.06 X |
| 2,941,537 | 6/1960 | Watkins | 137—1 |
| 2,953,158 | 9/1960 | Shea | 137—268 |
| 2,951,255 | 9/1960 | Ver Nooy | 15—104.06 |
| 2,965,114 | 12/1960 | Harden | 137—1 |
| 2,965,125 | 12/1960 | Osborne | 137—268 |
| 3,056,156 | 10/1962 | Immel | 15—104.06 |

ISADOR WEIL, *Primary Examiner.*

WILLIAM F. O'DEA, *Examiner.*